United States Patent
Byun

(10) Patent No.: US 10,901,891 B2
(45) Date of Patent: Jan. 26, 2021

(54) CONTROLLER AND OPERATION METHOD THEREOF

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 46 days.

(21) Appl. No.: 16/279,730

(22) Filed: Feb. 19, 2019

(65) Prior Publication Data

US 2020/0034289 A1 Jan. 30, 2020

(30) Foreign Application Priority Data

Jul. 27, 2018 (KR) .......................... 10-2018-0087855

(51) Int. Cl.
*G06F 13/00* (2006.01)
*G06F 12/02* (2006.01)
*G06F 3/06* (2006.01)

(52) U.S. Cl.
CPC ........ *G06F 12/0253* (2013.01); *G06F 3/0608* (2013.01); *G06F 3/0616* (2013.01); *G06F 3/0652* (2013.01); *G06F 3/0653* (2013.01); *G06F 3/0673* (2013.01); *G06F 2212/1024* (2013.01); *G06F 2212/1036* (2013.01); *G06F 2212/1044* (2013.01)

(58) Field of Classification Search
CPC ... G06F 12/0253; G06F 3/0652; G06F 3/0653
See application file for complete search history.

(56) References Cited

U.S. PATENT DOCUMENTS

| | | | | |
|---|---|---|---|---|
| 8,843,712 | B1* | 9/2014 | Smith | G06F 12/0246 711/159 |
| 2012/0311237 | A1* | 12/2012 | Park | G06F 12/0246 711/103 |
| 2015/0169443 | A1* | 6/2015 | Lee | G06F 12/0253 711/103 |
| 2015/0347028 | A1* | 12/2015 | Kotte | G06F 3/0635 711/154 |
| 2015/0347295 | A1* | 12/2015 | Ihm | G06F 12/0246 711/103 |
| 2016/0162215 | A1* | 6/2016 | Jayaraman | G06F 3/0688 711/103 |
| 2017/0010815 | A1 | 1/2017 | Sprouse et al. | |

FOREIGN PATENT DOCUMENTS

KR 1020160040693 4/2016
KR 101735142 5/2017

\* cited by examiner

*Primary Examiner* — Sean D Rossiter
(74) *Attorney, Agent, or Firm* — IP & T Group LLP

(57) ABSTRACT

A controller for controlling a memory device including memory dies includes: a processor suitable for checking whether or not any of the memory dies in the memory device is idle after transferring a write command to the memory device, and when there is an idle memory die, performing a garbage collection read operation of the idle memory die; and a garbage collection (GC) data region suitable for storing a valid data of a victim block, which is read through the garbage collection read operation; and wherein the processor transfers the valid data to the memory device based on an amount of valid data stored in the GC data region and controlling the memory device to perform a garbage collection write operation of programming the valid data in a target block.

13 Claims, 14 Drawing Sheets

CONTROLLER AND OPERATION METHOD THEREOF

CROSS-REFERENCE TO RELATED APPLICATION

The present application claims priority of Korean Patent Application No. 10-2018-0087855, filed on Jul. 27, 2018, which is incorporated herein by reference in its entirety.

BACKGROUND

1. Field

Various embodiments of the present invention generally relate to a controller. Particularly, the embodiments relate to a controller for controlling a memory device including a memory die and a method for operating the controller.

2. Description of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since they have no moving parts, such memory systems provide advantages such as excellent stability and durability, high information access speed, and low power consumption. Examples of memory systems having such advantages include universal serial bus (USB) memory devices, memory cards having various interfaces, and solid state drives (SSD).

SUMMARY

Embodiments of the present invention are directed to a controller that may reduce the extent of deterioration in the performance of a memory system caused by a garbage collection operation, and a method for operating the controller.

In accordance with an embodiment of the present invention, a controller for controlling a memory device including memory dies includes: a processor suitable for checking whether or not any of the memory dies in the memory device is idle after transferring a write command to the memory device, and when there is an idle memory die, performing a garbage collection read operation of the idle memory die; and a garbage collection (GC) data region suitable for storing a valid data of a victim block, which is read through the garbage collection read operation; and wherein the processor transfers the valid data to the memory device based on an amount of valid data stored in the GC data region and controlling the memory device to perform a garbage collection write operation of programming the valid data in a target block.

In accordance with another embodiment of the present invention, a method for operating a controller that controls a memory device including memory dies includes: transferring a write command to the memory device; checking whether any of the memory dies is idle after the transferring of the write command to the memory device; when there is an idle memory die, storing a valid data of a victim block, which is read through a garbage collection read operation of the idle memory die in a garbage collection (GC) data region in the controller; and transferring the valid data to the memory device based on an amount of valid data stored in the GC data region, and controlling the memory device to perform a garbage collection write operation of programming the valid data in a target block.

In accordance with another embodiment of the present invention, a memory system includes: a memory device including memory dies; and a controller suitable for controlling the memory device, the controller including a garbage collection (GC) data region suitable for storing items of valid data of a victim block, and a GC address region suitable for storing valid data addresses corresponding to the stored items of valid data of the victim block, wherein each of the valid data addresses is stored in association with the memory die where the corresponding item of valid data is stored; wherein the controller is further suitable for: storing the items of valid data of a victim block in the GC data region when the die on which the victim block resides in a specific state, and controlling the memory device to perform a garbage collection write operation including transferring the items of valid data in the GC data region to a target block based on a condition pertaining to valid data stored in the GC data region.

DETAILED DESCRIPTION

Figure 1:
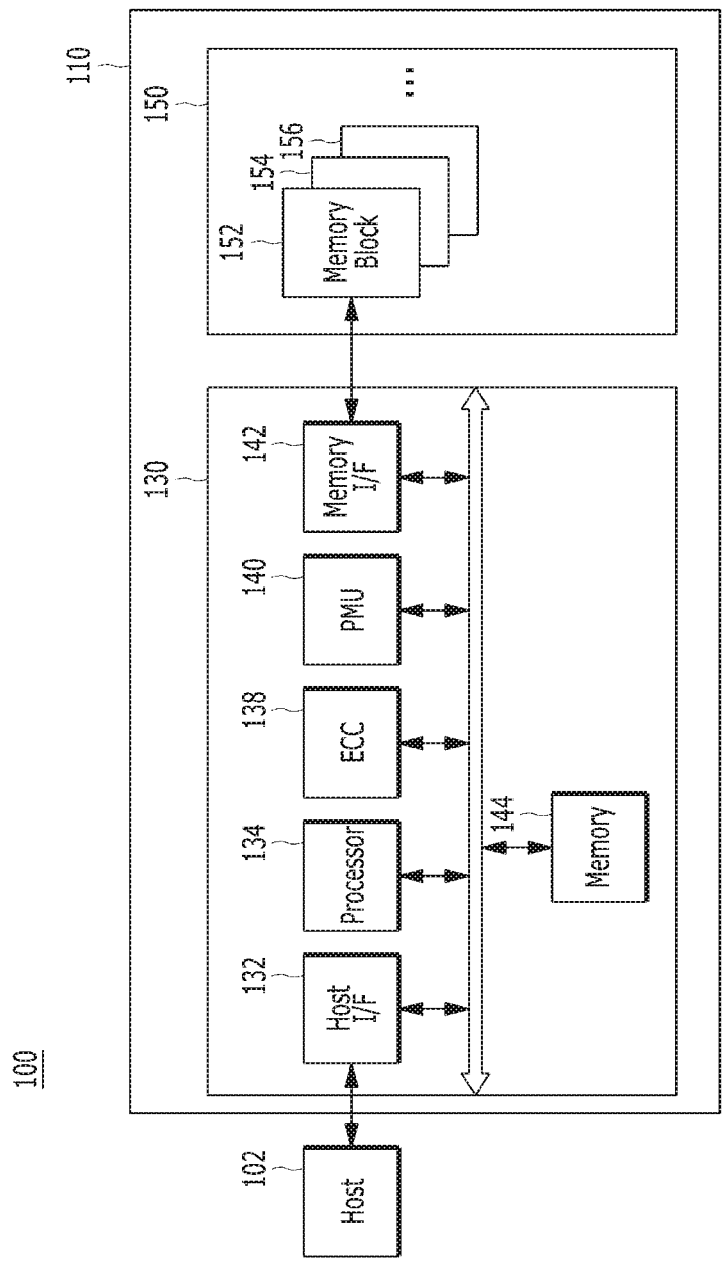
FIG. 1 is a block diagram illustrating a data processing system including a memory system in accordance with an embodiment of the present invention.

Various embodiments of the present invention is described below in more detail with reference to the accompanying drawings. The embodiments of the present invention may, however, be configured in different forms and thus should not be construed as limited to the embodiments set forth herein. Rather, these embodiments are provided so that this disclosure is thorough and complete and fully conveys the scope of the present invention to those skilled in the art. Throughout the disclosure, like reference numerals refer to like parts throughout the various figures and embodiments of the present invention. Also, throughout the specification, reference to "an embodiment," "another embodiment" or the like is not necessarily to only one embodiment, and different references to any such phrase are not necessarily to the same embodiment(s).

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the embodiments of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present. Communication between two elements, whether directly or indirectly connected/coupled, may be wired or wireless, unless stated or the context indicates otherwise.

As used herein, singular forms may include the plural forms as well and vice versa, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Hereinafter, the various embodiments of the present invention will be described in detail with reference to the attached drawings.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include any of various portable electronic devices such as a mobile phone, MP3 player and laptop computer, or any of various non-portable electronic devices such as a desktop computer, a game machine, a television (TV), and a projector.

The host 102 may include at least one operating system (OS), which may manage and control overall functions and operations of the host 102, and provide operation between the host 102 and a user using the data processing system 100 or the memory system 110. The OS may support functions and operations corresponding to the purpose and usage of a user. For example, the OS may be divided into a general OS and a mobile OS, depending on the mobility of the host 102. The general OS may be divided into a personal OS and an enterprise OS, depending on the environment of a user. For example, the personal OS configured to support a function of providing a service to general users may include Windows and Chrome, and the enterprise OS configured to secure and support high performance may include Windows server, Linux and Unix. Furthermore, the mobile OS configured to support a function of providing a mobile service to users and a power saving function of a system may include Android, iOS and Windows Mobile. The host 102 may include a plurality of OSs, and execute an OS to perform an operation corresponding to a user's request on the memory system 110.

The memory system 110 may operate to store data for the host 102 in response to a request of the host 102. Non-limiting examples of the memory system 110 include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC, and the like. The SD card may include a mini-SD card and micro-SD card.

The memory system 110 may be embodied by any of various types of storage devices. Examples of such storage devices may include, but are not limited to, volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory. The flash memory may have a 3-dimensional (3D) stack structure.

The memory system 110 may include a controller 130 and a memory device 150. The memory device 150 may store data for the host 102, and the controller 130 may control data storage into the memory device 150.

The controller 130 and the memory device 150 may be integrated into a single semiconductor device, which may be included in any of the various types of memory systems exemplified above. For example, the controller 130 and the memory device 150 may be integrated as one semiconductor device to constitute a solid state drive (SSD). When the memory system 110 is used as an SSD, the operating speed of the host 102 connected to the memory system 110 can be improved. Alternatively, the controller 130 and the memory device 150 may be integrated as one semiconductor device to constitute a memory card such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD, micro-SD and SDHC, or universal flash storage (UFS) device.

Non-limiting application examples of the memory system 110 include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, and/or one of various components constituting a computing system.

The memory device 150 may be a nonvolatile memory device that retains data stored therein even when power is not supplied. The memory device 150 may store data provided from the host 102 through a write operation, and provide data stored therein to the host 102 through a read operation. The memory device 150 may include a plurality of memory blocks 152, 154, 156 . . . , each of which may include a plurality of pages, and each of the pages may include a plurality of memory cells coupled to a word line. In an embodiment, the memory device 150 may be a flash memory. The flash memory may have a 3-dimensional (3D) stack structure.

Since the structure of the memory device 150 including its 3D stack structure is described in detail below with reference to FIGS. 2 to 4, further description of these elements and features is omitted here.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

The controller 130 may include a host interface (I/F) 132, a processor 134, an error correction code (ECC) component 138, a Power Management Unit (PMU) 140, a memory I/F 142 such as a NAND flash controller (NFC), and a memory 144, all operatively coupled via an internal bus.

The host interface 132 may be configured to process a command and data of the host 102, and may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and integrated drive electronics (IDE).

The ECC component 138 may detect and correct an error contained in the data read from the memory device 150. In other words, the ECC component 138 may perform an error correction decoding process to the data read from the memory device 150 using an ECC code used during an ECC encoding process. According to a result of the error correction decoding process, the ECC component 138 may output a signal, for example, an error correction success/fail signal. When the number of error bits is more than a threshold value of correctable error bits, the ECC component 138 may not correct the error bits, and may instead output an error correction fail signal.

The ECC component 138 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the error correction is not limited to these techniques, and thus the ECC component 138 is not limited to any specific structure. The ECC component 138 may include any and all circuits, modules, systems or devices for suitable error correction.

The PMU 140 may provide and manage power of the controller 130.

The memory I/F 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the memory I/F 142 may generate a control signal for the memory device 150 and process data to be provided to the memory device 150 under the control of the processor 134. The memory I/F 142 may work as an interface (e.g., a NAND flash interface) for processing a command and data between the controller 130 and the memory device 150. Specifically, the memory I/F 142 may support data transfer between the controller 130 and the memory device 150.

The memory 144 may serve as a working memory of the memory system 110 and the controller 130, and store data for driving the memory system 110 and the controller 130. The controller 130 may control the memory device 150 to perform read, write, program and erase operations in response to a request from the host 102. The controller 130 may provide data read from the memory device 150 to the host 102, may store data provided from the host 102 into the memory device 150. The memory 144 may store data for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or externally to the controller 130. FIG. 1 shows the memory 144 disposed within the controller 130. In another embodiment, the memory 144 may be embodied by an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as flash translation layer (FTL). Also, the processor 134 may be realized as a microprocessor or a central processing unit (CPU).

For example, the controller 130 may perform an operation requested by the host 102 in the memory device 150 through the processor 134. In other words, the controller 130 may perform a command operation corresponding to a command received from the host 102, or other source. The controller 130 may perform a foreground operation as the command operation corresponding to the command received from the host 102. For example, the controller 130 may perform a program operation corresponding to a write command, a read operation corresponding to a read command, an erase operation corresponding to an erase command, and a parameter set operation corresponding to a set parameter command or a set feature command.

Also, the controller 130 may perform a background operation onto the memory device 150 through the processor 134. The background operation performed onto the memory device 150 may include an operation of copying and processing data stored in some memory blocks among the memory blocks 152 to 156 of the memory device 150 into other memory blocks, e.g., a garbage collection (GC) operation, an operation of swapping select memory blocks 152 to 156 or data stored therein, e.g., a wear-leveling (WL) operation, an operation of storing the map data stored in the controller 130 in the memory blocks 152 to 156, e.g., a map flush operation, or an operation of managing bad blocks of the memory device 150, e.g., a bad block management operation of detecting and processing bad blocks among the memory blocks 152 to 156.

A memory device of the memory system in accordance with an embodiment of the present invention is described in detail with reference to FIGS. 2 to 4.

Figure 2:
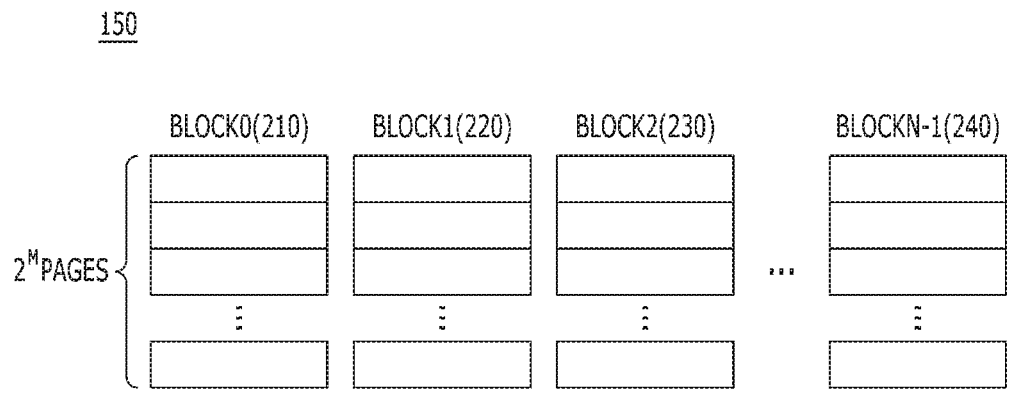
FIG. 2 is a schematic diagram illustrating an exemplary configuration of a memory device employed in the memory system of FIG. 1.
Figure 3:
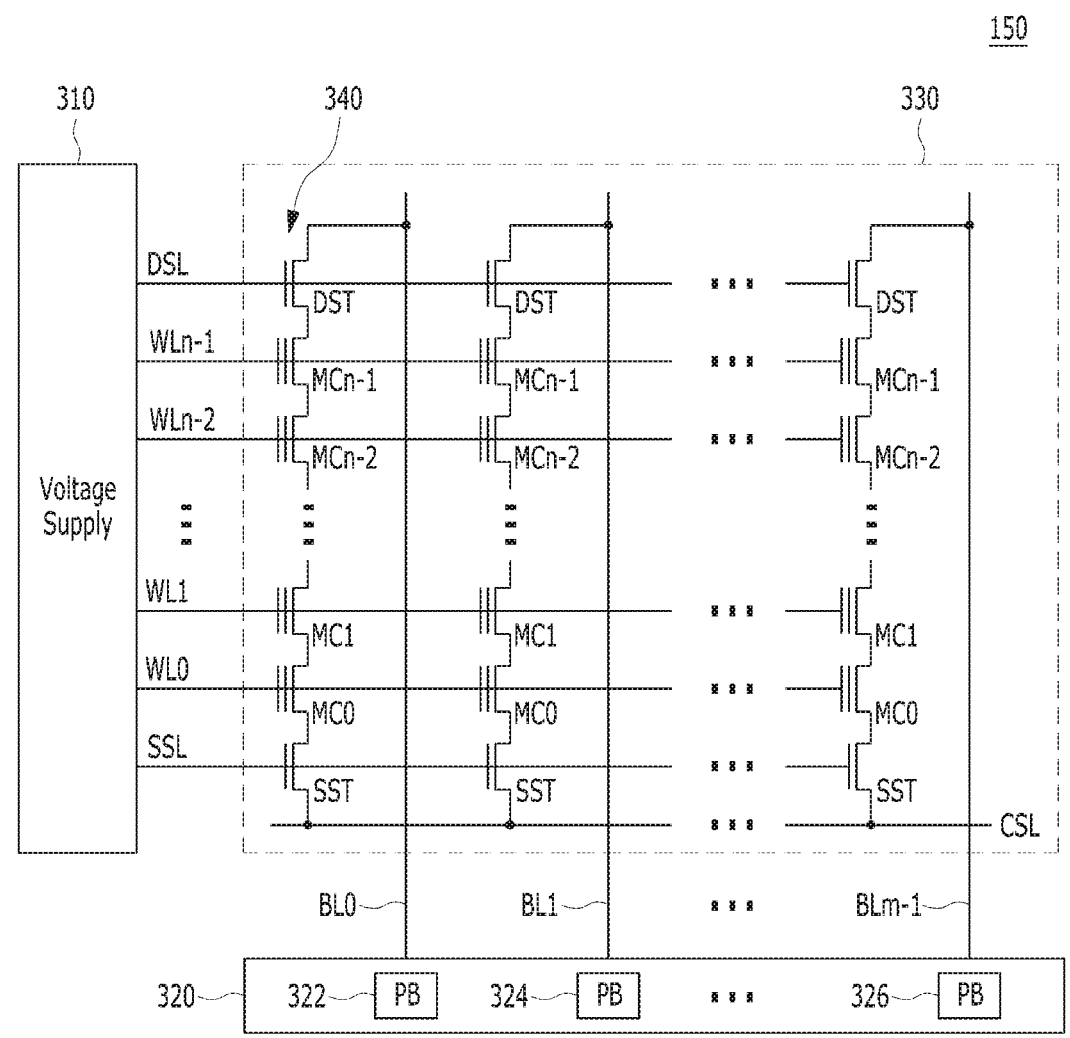
FIG. 3 is a circuit diagram illustrating an exemplary configuration of a memory cell array of a memory block in the memory device shown in FIG. 1.
Figure 4:
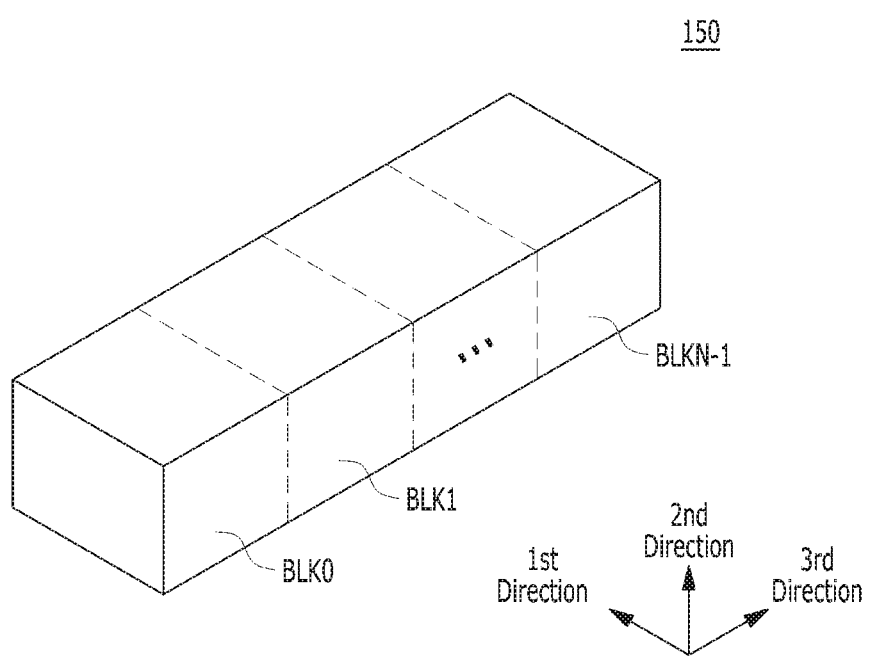
FIG. 4 is a block diagram illustrating an exemplary three-dimensional structure of the memory device shown in FIG. 2.

FIG. 2 is a schematic diagram illustrating the memory device 150, FIG. 3 is a circuit diagram illustrating an exemplary configuration of a memory cell array of a memory block in the memory device 150, and FIG. 4 is a schematic diagram illustrating an exemplary 3D structure of the memory device 150.

Referring to FIG. 2, the memory device 150 may include a plurality of memory blocks BLOCK0 to BLOCKN−1, e.g., BLOCK0 (210), BLOCK1 (220), BLOCK2 (230), and to BLOCKN−1 (240). Each of the memory blocks 210, 220, 230 and 240 may include a plurality of pages, for example $2^M$ pages, the number of which may vary according to circuit design. For example in some applications, each of the memory blocks may include M pages. Each of the pages may include a plurality of memory cells that are coupled to a plurality of word lines WL.

Also, the memory device 150 may include a plurality of memory blocks, which may include a single level cell (SLC) memory block storing 1-bit data and/or a multi-level cell (MLC) memory block storing 2-bit data. The SLC memory blocks may include a plurality of pages that are realized by memory cells storing one-bit data in one memory cell. The SLC memory blocks may have a quick data operation performance and high durability. On the other hand, the MLC memory blocks may include a plurality of pages that are realized by memory cells storing multi-bit data, e.g., data of two or more bits, in one memory cell. The MLC memory blocks may have a greater data storing space than the SLC memory blocks. In other words, the MLC memory blocks may be highly integrated. Particularly, the memory device 150 may include not only the MLC memory blocks, each of which includes a plurality of pages that are realized by memory cells capable of storing two-bit data in one memory cell, but also higher level MLC memory blocks such as triple level cell (TLC) memory blocks each of which includes a plurality of pages that are realized by memory cells capable of storing three-bit data in one memory cell, quadruple level cell (QLC) memory blocks each of which includes a plurality of pages that are realized by memory cells capable of storing four-bit data in one memory cell, and/or multiple level cell memory blocks each of which includes a plurality of pages that are realized by memory cells capable of storing five or more-bit data in one memory cell, and so forth.

In accordance with an embodiment of the present invention, the memory device 150 is described as a non-volatile memory, such as a flash memory, e.g., a NAND flash memory. However, the memory device 150 may be realized as any of a Phase Change Random Access Memory (PCRAM), a Resistive Random Access Memory (RRAM or ReRAM), a Ferroelectric Random Access Memory (FRAM), a Spin Transfer Torque Magnetic Random Access Memory (STT-RAM or STT-MRAM).

The memory blocks 210, 220, 230 and 240 may store the data transferred from the host 102 through a program operation, and transfer data stored therein to the host 102 through a read operation.

Referring to FIG. 3, a memory block 330 is representative of any of the plurality of memory blocks 152 to 156 included in the memory device 150 of the memory system 110. Each memory block 330 may include a plurality of cell strings 340 coupled to a plurality of corresponding bit lines BL0 to BLm−1. The cell string 340 of each column may include one or more drain select transistors DST and one or more source select transistors SST. Between the drain and source select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1. For reference, in FIG. 3, 'DSL' denotes a drain select line, 'SSL' denotes a source select line, and 'CSL' denotes a common source line.

Although FIG. 3 illustrates NAND flash memory cells, this disclosure is not limited in this way. It is noted that the memory cells may be NOR flash memory cells, or hybrid flash memory cells including two or more types of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply 310 which provides word line voltages including a program voltage, a read voltage and a pass voltage to supply to the word lines according to an operation mode. The voltage generation operation of the voltage supply 310 may be controlled by a control circuit (not illustrated). Under the control of the control circuit, the voltage supply 310 may select one of the memory blocks (or sectors) of the memory cell array, select one of the word lines of the selected memory block, and provide the word line voltages to the selected word line and the unselected word lines as may be needed.

The memory device 150 may include a read and write (read/write) circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs). Each of the page buffers 322 to 326 may include a plurality of latches (not illustrated).

The memory device 150 may be embodied by a two-dimensional (2D) or three-dimensional (3D) memory device. Particularly, as illustrated in FIG. 4, the memory device 150 may be embodied by a nonvolatile memory device having a 3D stack structure. When the memory device 150 has a 3D structure, the memory device 150 may include a plurality of memory blocks BLOCK0 to BLOCKN−1. FIG. 4 is a block diagram illustrating the memory blocks 152 to 156 of the memory device 150 shown in FIG. 1. Each of the memory blocks 152 to 156 may be realized in a 3D structure (or vertical structure). For example, the memory blocks 152 to 156 may be a three-dimensional structure with dimensions extending in first to third directions, e.g., an x-axis direction, a y-axis direction, and a z-axis direction.

Each memory block 330 included in the memory device 150 may include a plurality of NAND strings NS that extend in the second direction, and a plurality of NAND strings NS (not shown) that extend in the first direction and the third direction. Each of the NAND strings NS may be coupled to a bit line BL, at least one string select line SSL, at least one ground select line GSL (not shown), a plurality of word lines WL, at least one dummy word line DWL (not shown), and a common source line CSL, and each of the NAND strings NS may include a plurality of transistor structures TS (not shown).

In short, each memory block 330 may be coupled to a plurality of bit lines BL, a plurality of source select lines SSL, a plurality of drain select lines DSL, a plurality of word lines WL, a plurality of dummy word lines DWL, and a plurality of common source lines CSL, and each memory block 330 may include a plurality of NAND strings NS. Also, in each memory block 330, one bit line BL may be coupled to a plurality of NAND strings NS to realize a plurality of transistors in one NAND string NS. Also, a source select transistor SST of each NAND string NS may be coupled to a corresponding bit line BL, and a drain select transistor DST of each NAND string NS may be coupled to a common source line CSL. Memory cells MC may be provided between the source select transistor SST and the drain select transistor DST of each NAND string NS. In other words, a plurality of memory cells may be realized in each memory block 330 of the memory device 150.

Figure 5:
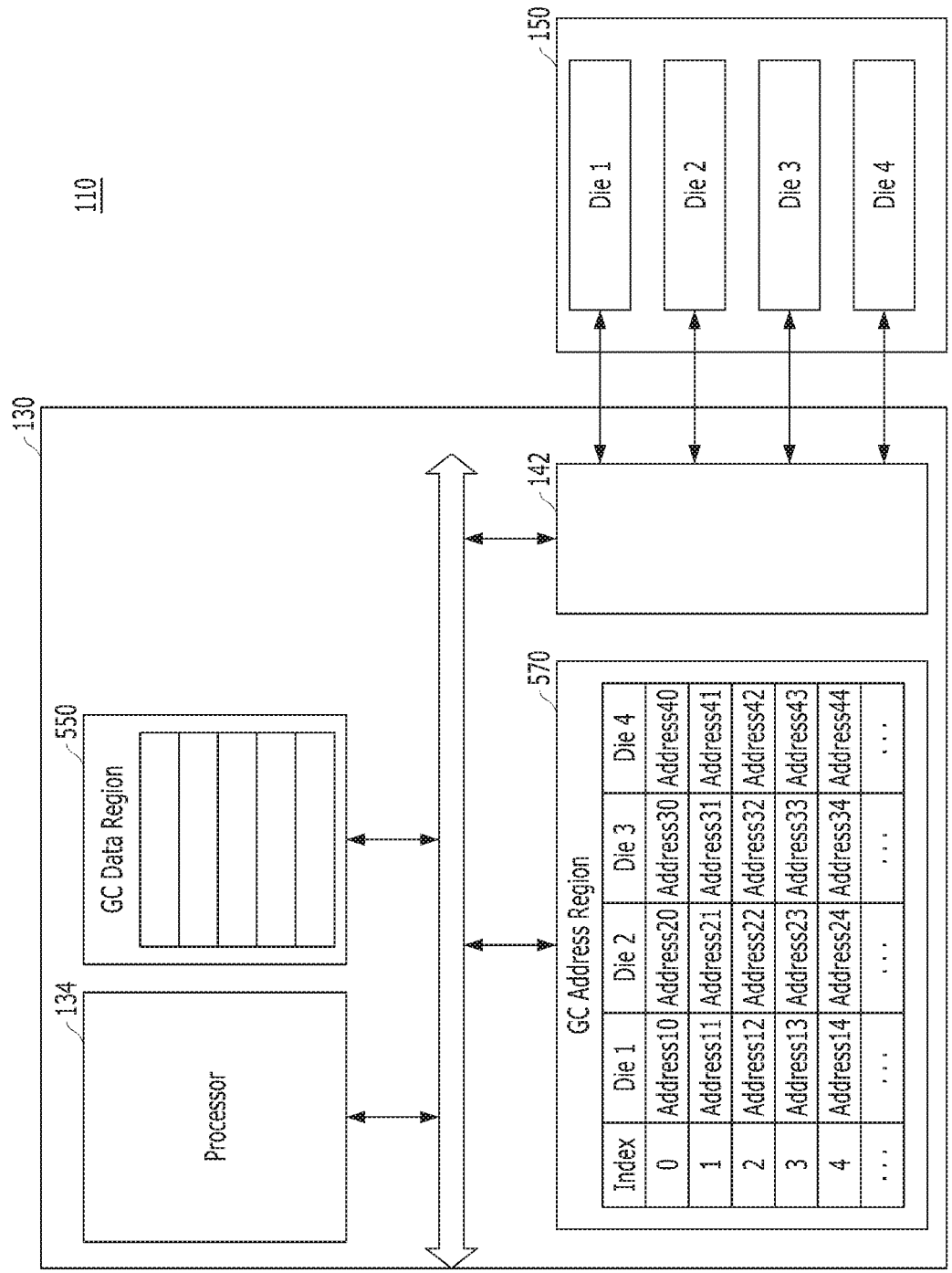
FIG. 5 is a block diagram illustrating a structure of a memory system in accordance with an embodiment of the present invention.

FIG. 5 is a block diagram illustrating a structure of a memory system in accordance with an embodiment of the present invention.

Non-volatile memory devices may not support an overwrite operation. For this reason, the memory device 150 may update data written in a page by invalidating the page where the existing data is written and writing the data to be updated in a new page. The controller 130 may perform a garbage collection operation as a background operation in order to prevent the efficiency of the memory system from decreasing due to the increasing invalidated pages.

To be specific, the garbage collection operation may include operations of reading valid data stored in a victim block, which is a memory block including an invalid page, and storing the valid data in the memory 144, writing the valid data in a target block, and erasing the data of the victim block so as to generate a free block. In this specification, the operation of reading the valid data stored in the victim block is defined as a garbage collection read operation, and the operation of writing the read valid data in the target block is defined as a garbage collection write operation.

The performance of the memory system 110 in executing a foreground operation may be decreased due to the garbage collection read operation and the garbage collection write operations, which are background operations.

The memory device 150 may include a memory die, which may be in an idle state in which no operation is performed. When the memory device 150 includes a plurality of memory dies, some of the memory dies may be in the idle state. For example, depending on the attribute of a write command or the amount of data corresponding to the write command, the memory device 150 may not operate in a full interleaving manner in which the memory device 150 performs a write operation in an interleaved manner on all memory dies.

According to an embodiment of the present invention, when a memory die is in the idle state, valid data of a victim block which is read by performing a garbage collection read operation may be stored in the memory 144 of the controller 130. When the amount of the stored valid data is equal to or greater than a threshold value, the valid data may be written in a target block. According to an embodiment of the present invention, the performance of the memory system 110 may be improved by performing a background operation on the idle memory die to minimize the time that the memory die is in the idle state.

Referring to FIG. 5, the memory system 110 according to an embodiment of the present invention may include the controller 130 and the memory device 150. The controller 130 and the memory device 150 of FIG. 5 may correspond to the controller 130 and the memory device 150 described in FIG. 1.

According to an embodiment of the present invention, the controller 130 may include the processor 134, the memory interface 142, a GC data region 550, and a GC address region 570. The processor 134 and the memory interface 142 may correspond to those described in FIG. 1. The constituent elements of the controller 130 may be interconnected to each other through buses to communicate with each other.

The memory device 150 may include at least one memory die. By way of example and not limitation, the memory device 150 may include four memory dies Die 1 to Die 4. Each of the memory dies Die 1 to Die 4 may be connected to the memory interface 142 through a channel and communicate with the memory interface 142 through the channel.

The processor 134 may store the valid data in the GC memory region 550 by performing a garbage collection read operation on the victim block in an idle memory die. When the amount of data stored in the GC memory region 550 is equal to or greater than the threshold value, the processor 134 may perform a garbage collection write operation and control the general operation of the memory system 110.

The processor 134 may decide a victim block based on a set or predetermined criterion before performing a garbage collection operation. For example, a memory block having a set or predetermined number of valid pages or less may be set as a victim block.

The GC address region 570 may store a valid data address, which is a physical address of a page where the valid data is stored among the pages included in the victim block. When the memory device 150 includes a plurality of memory dies, it may store the valid data address for each of the memory dies.

As shown in FIG. 5, the memory device 150 may include four memory dies, and the GC address region 570 may store the valid data address for each of the four memory dies. However, the memory device 150 is not limited to this specific configuration. The memory device 150 may include any suitable number of dies.

According to an embodiment of the present invention, the GC address region 570 may store a GC address table that stores the valid data addresses. The GC address table may include the memory dies Die 1 to Die 4 as fields. Each field may store valid data addresses for its associated memory die, or an indicator indicating whether a garbage collection read operation or a garbage collection write operation is performed or not on each valid data address.

According to an embodiment of the present invention, the GC address table may be a first-in first-out (FIFO) table. To be specific, when a victim block of each memory die is decided, the valid data addresses in that victim block may be stored in the entries for that memory die in the index order. The garbage collection read operation may be performed in the above index order.

The GC data region 550 may store the valid data which is read as the processor 134 performs a garbage collection read operation on the valid data of the valid data address. FIG. 5 illustrates that the GC data region 550 may store valid data corresponding to five valid data addresses for each die. However, the GC data region 550 may be configured to store more than five valid data addresses.

According to an embodiment of the present invention, the GC data region 550 and the GC address region 570 may be included in the memory 144 described with reference to FIG. 1.

Figure 6:
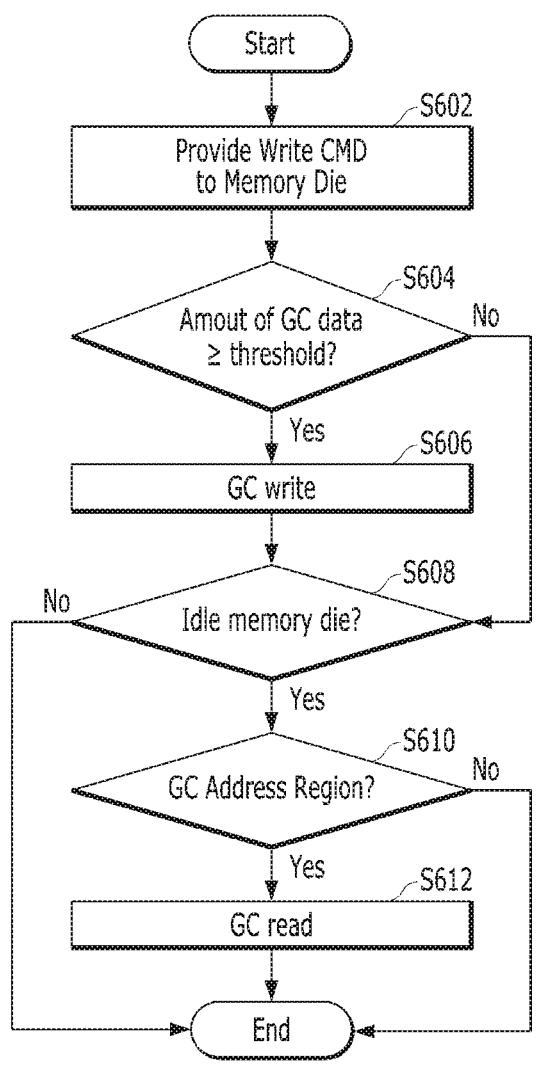
FIG. 6 is a flowchart describing an operation of a memory system in accordance with an embodiment of the present invention.

FIG. 6 is a flowchart describing an operation of the memory system 110 in accordance with an embodiment of the present invention.

Referring to FIG. 6, in step S602, the processor 134 may transfer a write command to each memory die of the memory device 150 through the memory interface 142.

The operation of the step S602 may be performed when the controller 130 receives a write command from the host 102 or when a write command is generated by the controller 130.

In step S604, the processor 134 may determine whether the amount of data stored in the GC data region 550 is equal to or greater than a threshold value.

If the amount of data stored in the GC data region 550 is equal to or greater than a threshold value ('No' in the step S604), the processor 134 may decide in step S608 whether or not there is an idle memory die at present If the amount of data stored in the GC data region 550 is equal to or greater than a threshold value ('Yes' in the step S604), the processor 134 may transfer a garbage collection write command to the memory device 150 in step S606. The memory device 150 may write the data stored in the GC data region 550 in a target block in response to the garbage collection write command.

The processor 134 may decide the target memory block in advance based on a set or predetermined criterion. For example, the processor 134 may select, as the target block, a memory block having a low degree of wear among free blocks. The processor 134 may select any memory block satisfying the predetermined criterion as the target block regardless of which die that memory block is in.

As will be described later, when the garbage collection write operation is completed, the processor 134 may change the indicator for the entry of the GC address region 570 storing a read indicator from 'Read' to 'Written'. The processor 134 may update mapping information between the logical address and the physical address for the valid data for which the garbage collection write operation is completed and then remove the 'Written' indicator.

After transferring all the write commands to each memory die of the memory device 150 in the steps S602 and S606, the processor 134 may decide in the step S608 whether or not there is an idle memory die at present.

If there is an idle memory die at present ('Yes' in the step S608), the processor 134 may decide in step S610 whether or not there is a valid data address of the victim block in the idle memory die by referring to the GC address region 570.

If there is no idle memory die ('No' in the step S608), the processor 134 may terminate the operation according to the write command. A memory die in a busy state which has received a write command, that is, a busy die, may perform a write operation corresponding to the write command received from the processor 134.

If it turns out in the step S610 that there is an idle memory die but there is no valid data address for the idle memory die ('No' in the step S610), the processor 134 may terminate the operation according to the write command. Similarly, the busy die may perform a write operation corresponding to the write command.

If there is a valid data address for the idle memory die ('Yes' in the step S610), the processor 134 may control the memory device 150 to perform a garbage collection read operation in step S612, and store the read data in the GC data region 550. To be specific, the processor 134 may refer to the GC address region 570 and provide a garbage collection read command to read the data corresponding to the predetermined number of addresses stored in the GC address region 570. The idle memory die may read the valid data corresponding to the valid data address and provide it to the GC data region 550 through the memory interface 142 in response to the garbage collection read command.

The busy die may perform an operation corresponding to the write command received from the processor 134, while the idle memory die performs the garbage collection read operation.

As will be described below, when the execution of the garbage collection read operation is completed, the processor 134 may remove the corresponding valid data address from the GC address region 570 and store a 'read' indicator in the entry where the removed valid data address used to be stored.

Even before the amount of the data stored in the GC data region 550 reaches a threshold value, a garbage collection operation may be triggered, for example, to generate a free block. According to an embodiment of the present invention, in this case, a garbage collection read operation may be performed until the amount of the data stored in the GC data region 550 reaches the threshold value with reference to the GC address region 570 regardless of whether there is an idle memory die or not, and may perform a garbage collection write operation when the amount of the data stored in the GC data region 550 reaches the threshold value.

FIGS. 7A to 7D are block diagrams illustrating an operation of the memory system 110 in accordance with an embodiment of the present invention.

Figure 7A:
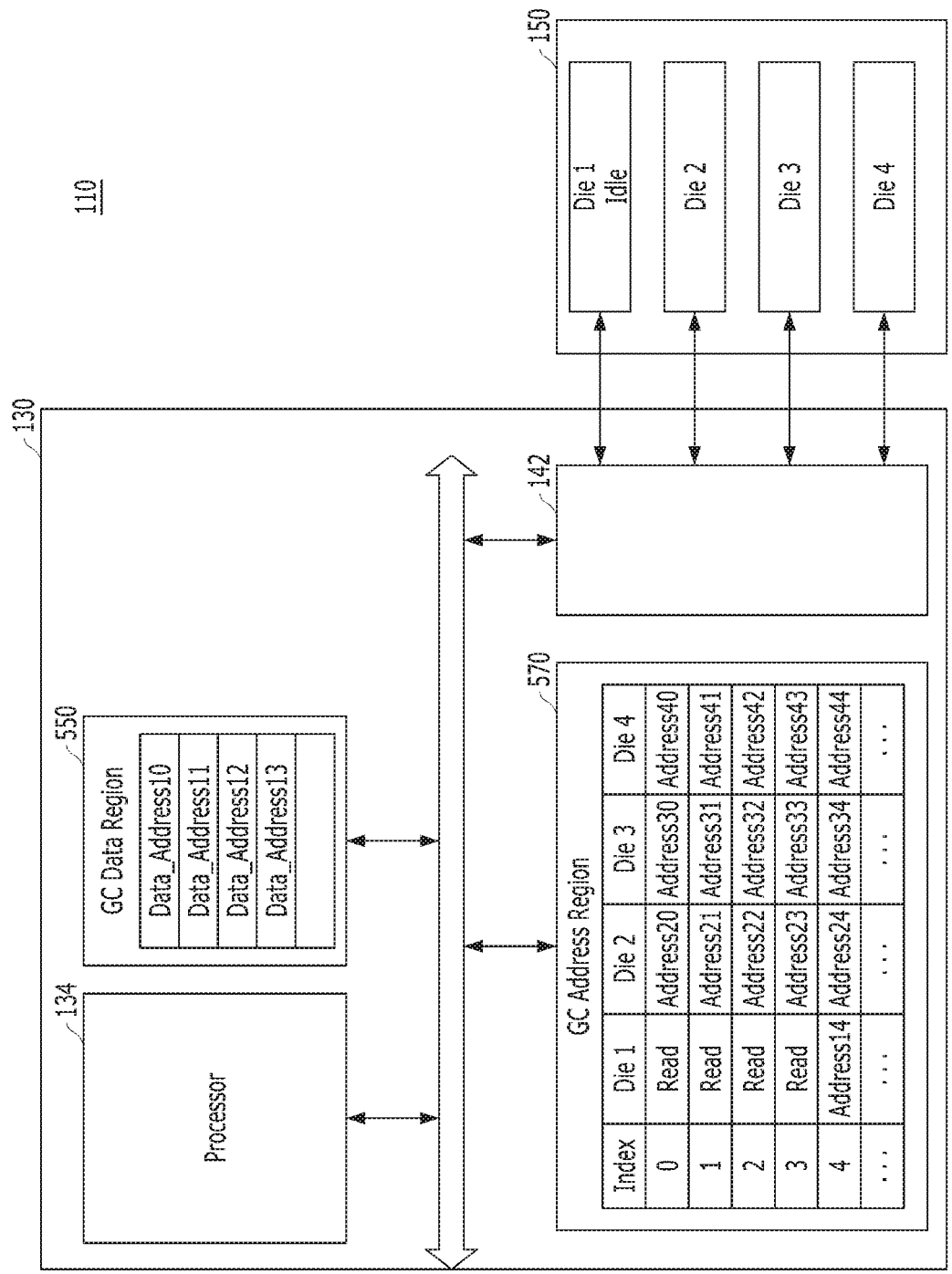
FIGS. 7A to 7D are block diagrams illustrating an operation of the memory system in accordance with an embodiment of the present invention.

FIG. 7A illustrates a state in which a garbage collection read operation is performed on the data corresponding to indices 0 to 3 of a first die Die 1 and the read data is stored in the GC data region 550.

The valid data address stored in the entry of each corresponding index may be removed from the GC address region 570 in a sense that the data corresponding to the index 0 to the index 3 of the first die Die 1 is read, and a 'Read' indicator may be stored in each entry.

The GC data region 550 of FIG. 7A may store data Data_Address10 to Data_Address13 corresponding to the valid data addresses corresponding to the index 0 to the index 3 of the first die Die 1. The amount of data stored in the current GC data region 550 may be less than the threshold value.

Figure 7B:
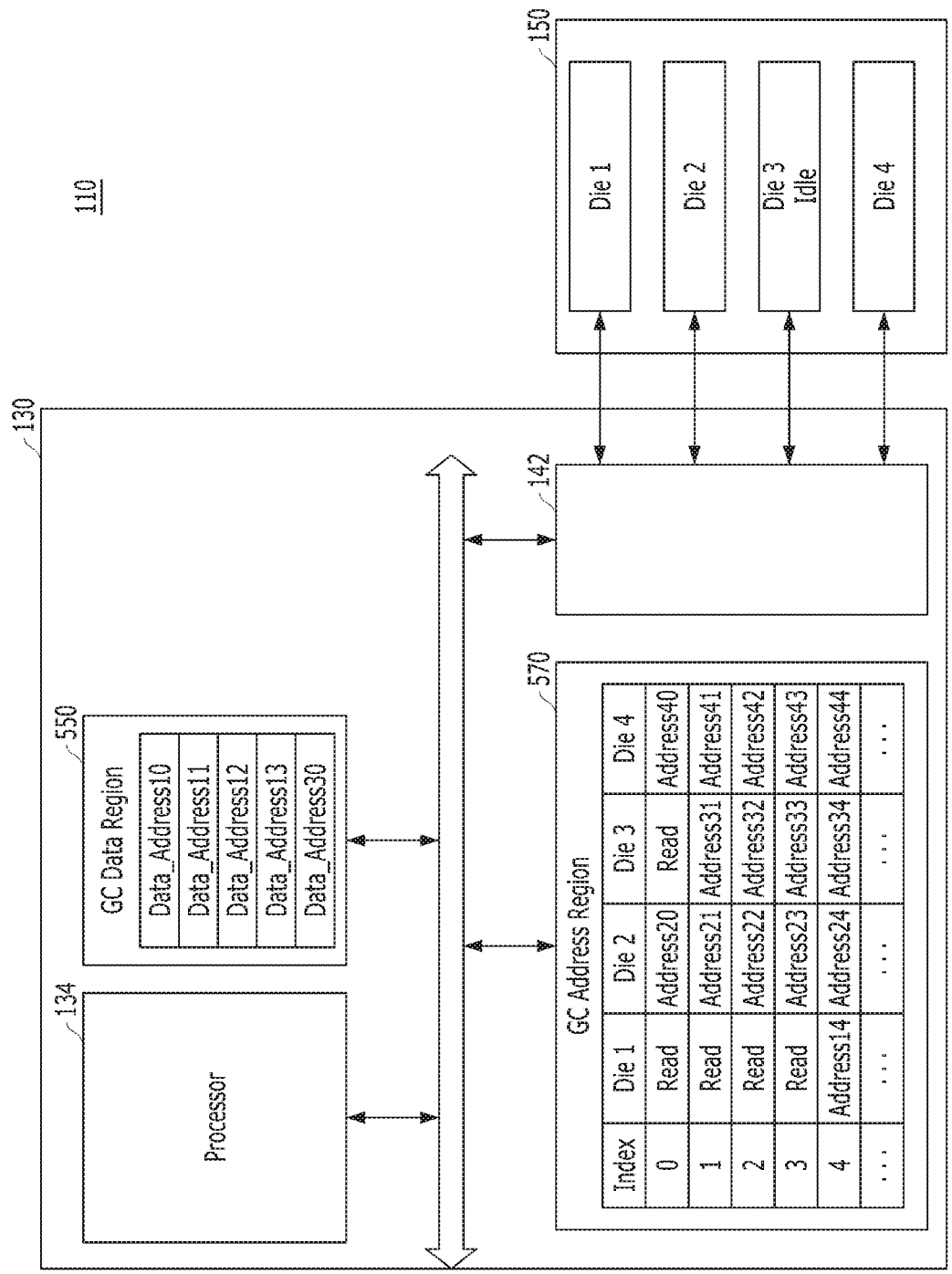

FIG. 7B illustrates a state in which a garbage collection read operation is additionally performed by performing the operations of the steps S602 to S610 in the state of FIG. 7A. Since the amount of the data stored in the GC data region 550 in the step S604 is less than the threshold value, the garbage collection write operation may not be performed. It turns out in step S606 that the third die Die 3, which is the current die, is an idle memory die, and step S608 reveals that there is a valid data address for the third die Die 3, and a garbage collection read operation is performed in step S610.

Referring to FIG. 7B, the valid data address stored in the corresponding index may be removed from the GC address region 570 in a sense that the data corresponding to the index 0 of the third die Die 3 is read, and a 'Read' indicator may be stored therein.

Continuing to refer to FIG. 7B, the GC data region 550 may store the data Data_Address10 to Data_Address13 corresponding to the valid data addresses corresponding to the index 0 to the index 3 of the first die Die 1 and the data Data_Address 30 corresponding to the valid data address corresponding to the index 0 of the third die Die 3. The amount of the data stored in the current GC data region 550 may reach the threshold value.

Figure 7C:
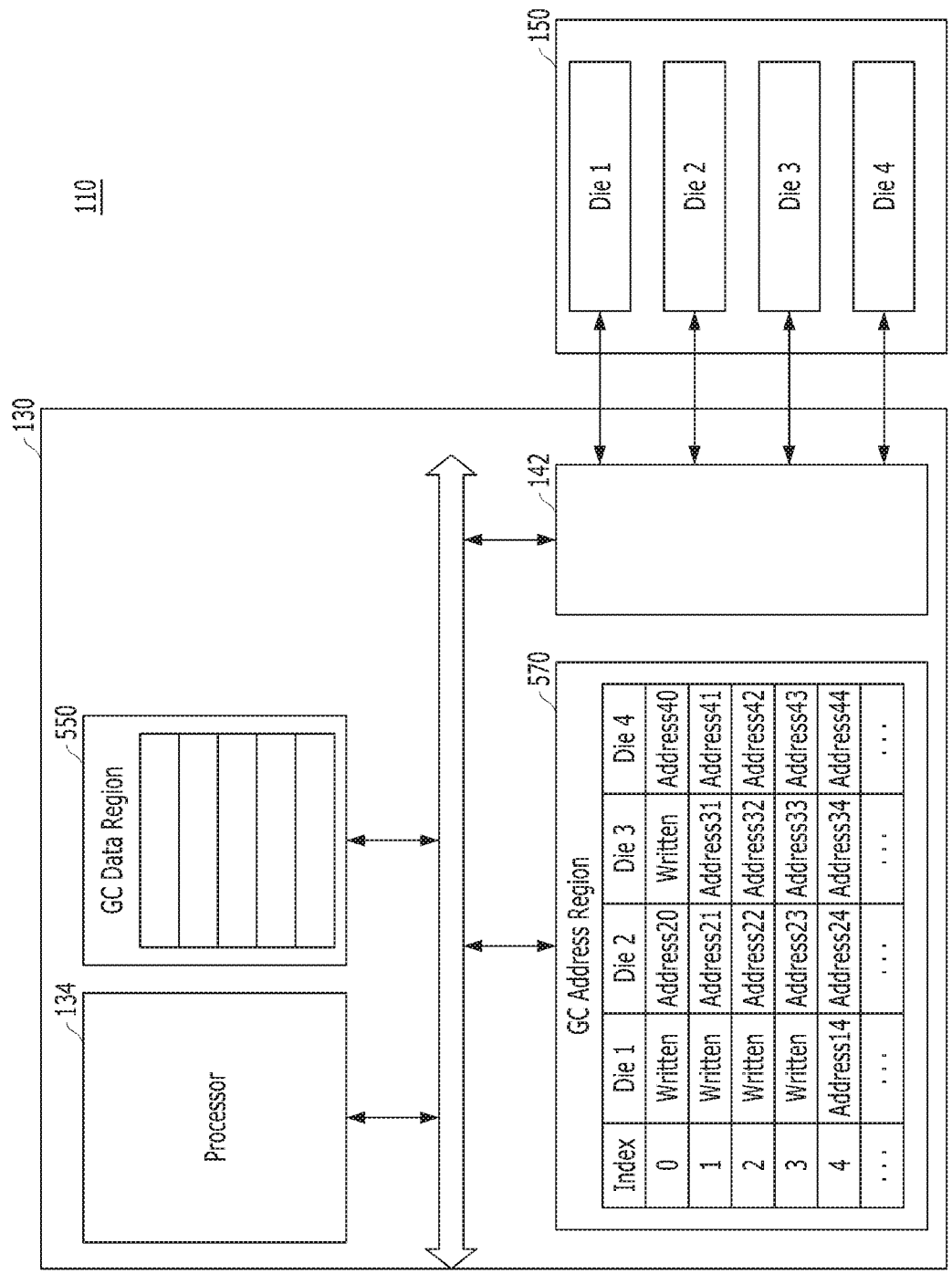
Figure 7D:
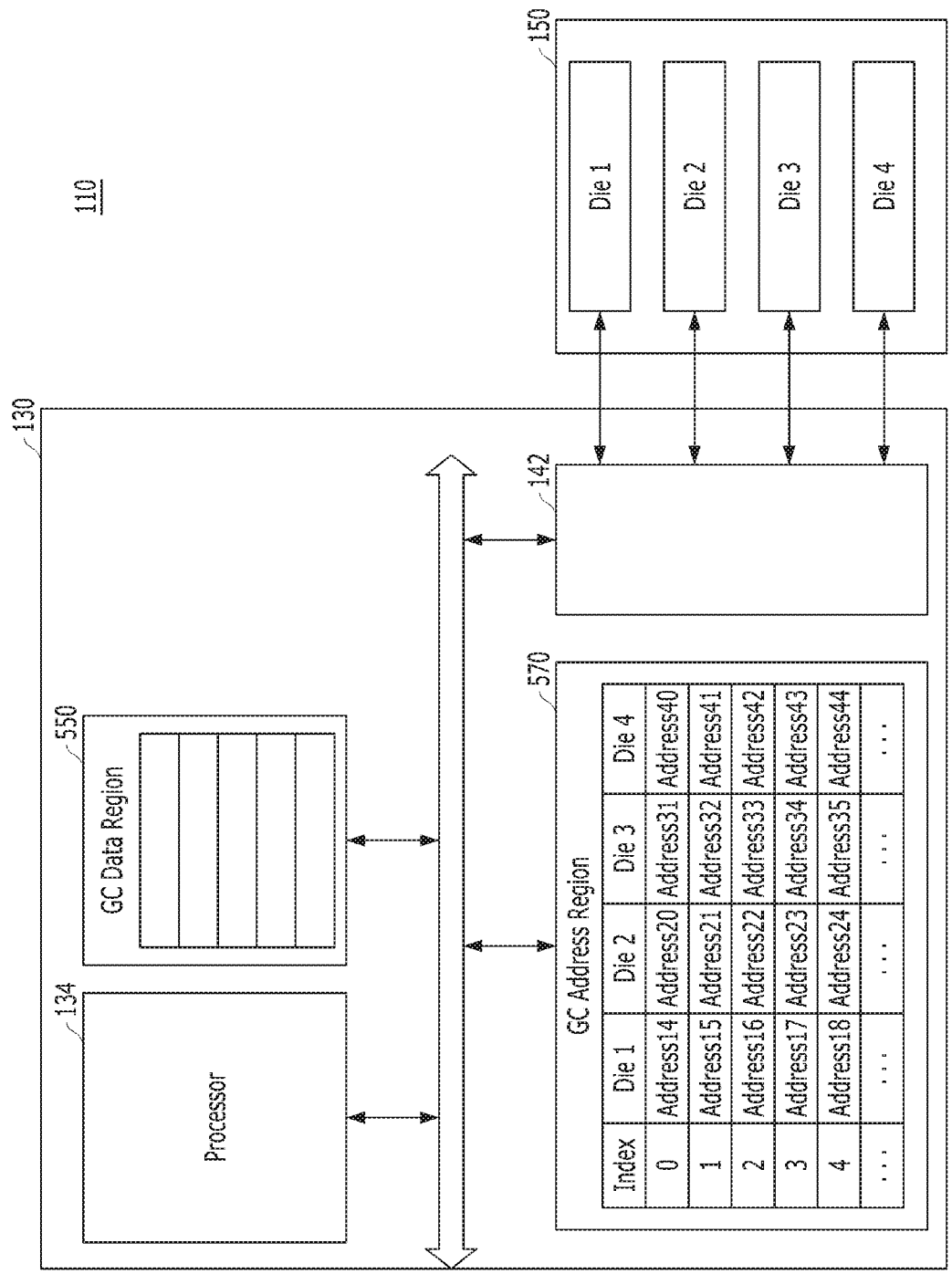

FIG. 7C illustrates a situation where the amount of the data stored in the GC data region 550 of FIG. 7B reaches the threshold value and a garbage collection write operation is performed.

Referring to the GC data region 550 of FIG. 7C, the data stored in the GC data region 550 may be written in a target block of the memory device 150 through a garbage collection write operation and then removed.

Referring to the GC address region 570 of FIG. 7C, after the data corresponding to the 'Read' indicator may be written through a garbage collection write operation, the 'Read' indicator may be changed to a 'Written' indicator. For example, when the garbage collection write operation is completed for all the valid data in the GC data region 550, the processor 134 may change all the 'Read' indicators of the GC address region 570 into the 'Written' indicators.

When the update of the mapping information between the logical address and the physical address is completed after the garbage collection write operation, the 'Written' indicator may be removed. For example, when the updating of the mapping information is completed for all data obtained after the garbage collection write operation, the processor 134 may remove all the 'Written' indicators in the GC address region 570. Referring to the GC address region 570 of FIG. 7D, the processor 134 may update the GC address region 570 by removing the 'Written' indicators of the GC address region 570.

According to an embodiment of the present invention, the valid data of a victim block, which is read through a garbage collection read operation when the memory die in which the victim block resides is in an idle state, may be stored in the memory 144, and when the amount of the stored valid data is equal to or greater than the threshold value, the valid data may be written into a target block.

According to an embodiment of the present invention, the performance of the memory system 110 may be improved by performing a background operation on the idle memory die to minimize the time that the memory die is in the idle state.

Referring to FIGS. 8 to 16, a data processing system and electronic devices, to which the memory system 110 including the memory device 150 and the controller 130 described in FIGS. 1 to 7D may be applied, are described in detail in accordance with embodiments of the present invention.

FIGS. 8 to 16 are diagrams schematically illustrating exemplary applications of the data processing system of FIGS. 1 to 7 according to various embodiments.

Figure 8:
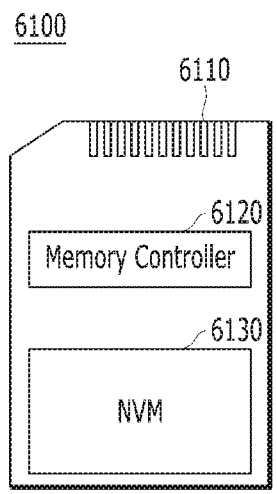
FIGS. 8 to 16 are diagrams schematically illustrating application examples of the data processing system in accordance with various embodiments of the present invention.

FIG. 8 is a diagram schematically illustrating the data processing system including the memory system in accordance with an embodiment. FIG. 8 schematically illustrates a memory card system 6100 to which the memory system is applied.

Referring to FIG. 8, the memory card system 6100 may include a memory controller 6120, a memory device 6130 and a connector 6110.

More specifically, the memory controller 6120 may be connected to the memory device 6130 embodied by a nonvolatile memory (NVM), and configured to access the memory device 6130.

For example, the memory controller 6120 may be configured to control read, write, erase and background operations of the memory device 6130. The memory controller 6120 may be configured to provide an interface between the memory device 6130 and a host (not shown), and drive firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

Thus, as shown in FIG. 1, the memory controller 6120 may include a random access memory (RAM), a processor, a host interface, a memory interface and an error correction component.

The memory controller 6120 may communicate with an external device, for example the host 102 of FIG. 1, through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), wireless fidelity (Wi-Fi or WiFi) and Bluetooth. Thus, the memory system and the data processing system may be applied to wired and/or wireless electronic devices, particularly mobile electronic devices.

The memory device 6130 may be implemented by a nonvolatile memory. For example, the memory device 6130 may be implemented by any of various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device. For example, the memory controller 6120 and the memory device 6130 may be integrated to form a solid-state driver (SSD). Also, the memory controller 6120 and the memory device 6130 may form a memory card such as a PC card (e.g., Personal Computer Memory Card International Association (PCMCIA)), a compact flash (CF) card, a smart media card (e.g., SM and SMC), a memory stick, a multimedia card (e.g., MMC, RS-MMC, MMCmicro and eMMC), an secured digital (SD) card (e.g., SD, miniSD, microSD and SDHC) and/or a universal flash storage (UFS).

Figure 9:
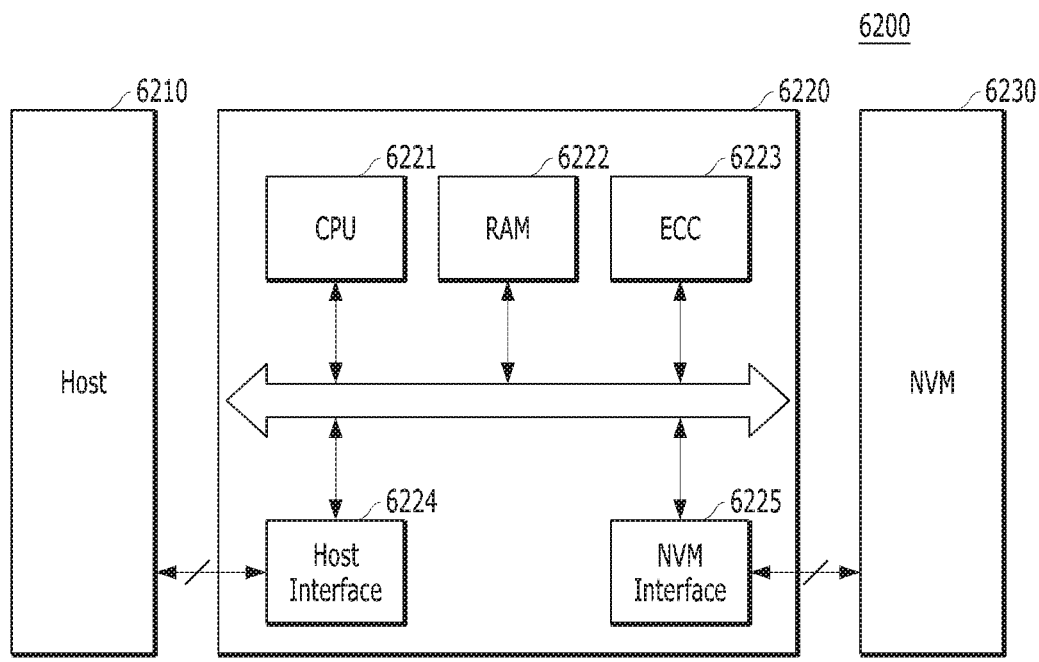

FIG. 9 is a diagram schematically illustrating another example of a data processing system 6200 including the memory system in accordance with an embodiment.

Referring to FIG. 9, the data processing system 6200 may include a memory device 6230 having one or more nonvolatile memories (NVMs) and a memory controller 6220 for controlling the memory device 6230. The data processing system 6200 may serve as a storage medium such as a memory card (CF, SD, micro-SD or the like) or USB device, as described with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write or erase operation on the memory device 6230 in response to a request of the host 6210, and the memory controller 6220 may include one or more central processing units (CPUs) 6221, a buffer memory such as a random access memory (RAM) 6222, an error correction code (ECC) circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the memory device 6230 to operate at high speed.

The ECC circuit 6223 may correspond to the ECC component 138 of the controller 130 illustrated in FIG. 1. As described with reference to FIG. 1, the ECC circuit 6223 may generate an error correction code (ECC) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. For example, as described with reference to FIG. 1, the ECC circuit 6223 may correct an error using Low Density Parity Check (LDPC) code, Bose-Chaudhri-Hocquenghem (BCH) code, turbo code, Reed-Solomon code, convolution code, Recursive Systematic Code (RSC) or coded modulation such as Trellis-Coded Modulation (TCM) or Block coded modulation (BCM).

The memory controller 6220 may exchange data with the host 6210 through the host interface 6224, and exchange data with the memory device 6230 through the NVM interface 6225. The host interface 6224 may be connected to the host 6210 through a parallel advanced technology attachment (PATA) bus, serial advanced technology attachment (SATA) bus, small computer system interface (SCSI), universal serial bus (USB), peripheral component interconnect-express (PCIe) or NAND interface. The memory controller 6220 may have a wireless communication function with a mobile communication protocol such as wireless fidelity (WiFi) or Long Term Evolution (LTE). The memory controller 6220 may be connected to an external device, for example, the host 6210 or another external device, and then exchange data with the external device. In particular, as the memory controller 6220 is configured to communicate with the external device through one or more of various communication protocols, the memory system and the data processing system may be applied to wired and/or wireless electronic devices, particularly a mobile electronic device.

Figure 10:
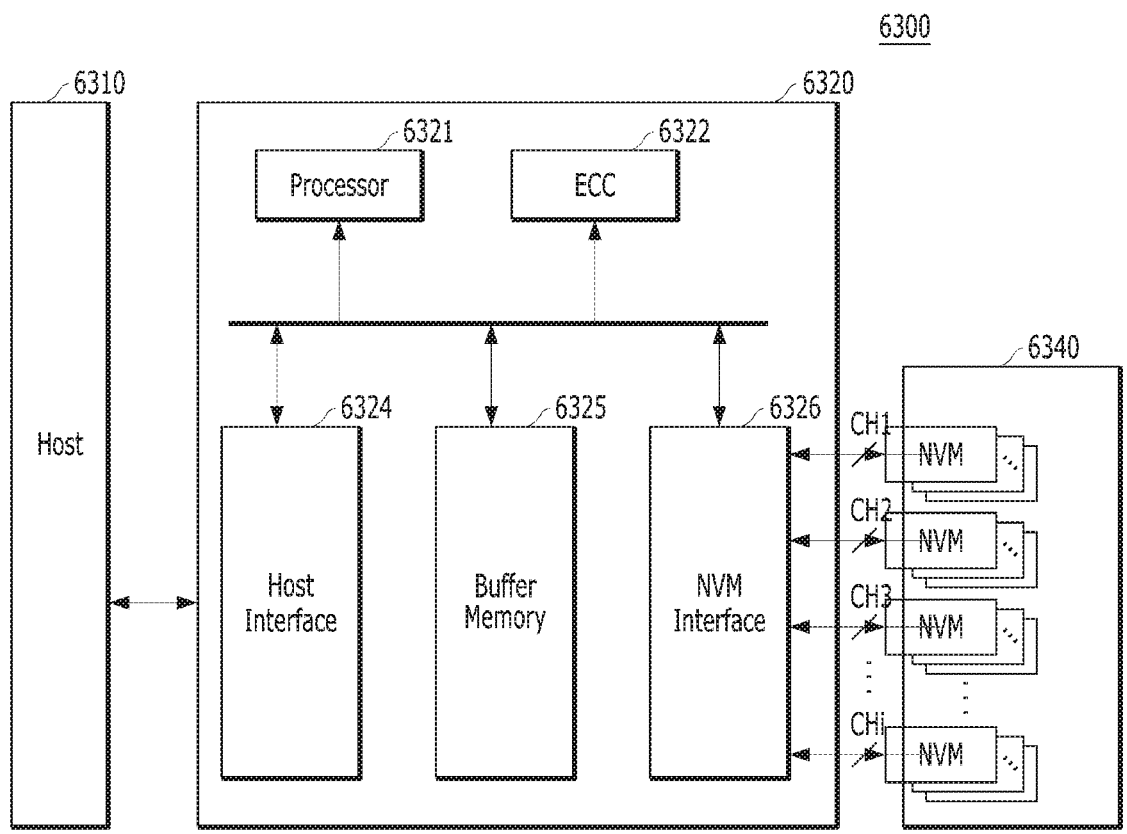

FIG. 10 is a diagram schematically illustrating another example of the data processing system including the memory system in accordance with an embodiment. FIG. 10 schematically illustrates a solid state drive (SSD) 6300 to which the memory system may be applied.

Referring to FIG. 10, the SSD 6300 may include a controller 6320 and a memory device 6340 including a plurality of nonvolatile memories (NVMs). The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, an error correction code (ECC) circuit 6322, a host interface 6324, a buffer memory 6325 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by any of various volatile memories such as dynamic random access memory (DRAM), synchronous DRAM (SDRAM), double data rate (DDR) SDRAM, low power DDR (LPDDR) SDRAM and graphics RAM (GRAM) or nonvolatile memories such as ferroelectric RAM (FRAM), resistive RAM (RRAM or ReRAM), spin-transfer torque magnetic RAM (STT-MRAM) and phase-change RAM (PRAM). FIG. 10 illustrates that the buffer memory 6325 is disposed in the controller 6320. However, the buffer memory 6325 may be external to the controller 6320.

The ECC circuit 6322 may calculate an error correction code (ECC) value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, a redundant array of independent disks (RAID) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 11:
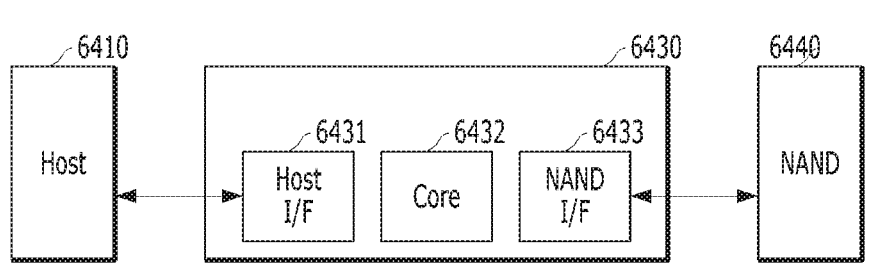

FIG. 11 is a diagram schematically illustrating another example of the data processing system including the memory system in accordance with an embodiment. FIG. 11 schematically illustrates an embedded Multi-Media Card (eMMC) 6400 to which the memory system may be applied.

Referring to FIG. 11, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface (I/F) 6431 and a memory interface, for example, a NAND interface (I/F) 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, Ultra High Speed (UHS)-I and/or UHS-II interface.

FIGS. 12 to 15 are diagrams schematically illustrating other examples of the data processing system including the memory system in accordance with one or more embodiments. FIGS. 12 to 15 schematically illustrate universal flash storage (UFS) systems to which the memory system may be applied.

Referring to FIGS. 12 to 15, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired and/or wireless electronic devices or particularly mobile electronic devices, the UFS devices 6520, 6620, 6720 and 6820 may serve as embedded UFS devices. The UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired and/or wireless electronic devices, particularly mobile electronic devices, through UFS protocols. The UFS devices 6520, 6620, 6720 and 6820 and the UFS cards 6530, 6630, 6730 and 6830 may be embodied by the memory system 110 illustrated in FIG. 1. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 9 to 11, and the UFS cards 6530, 6630, 6730 and 6830 may be embodied in the form of the memory card system 6100 described with reference to FIG. 8.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through any of various protocols other than the UFS protocol, for example, universal storage bus (USB) Flash Drives (UFDs), multimedia card (MMC), secure digital (SD), mini-SD, and micro-SD.

Figure 12:
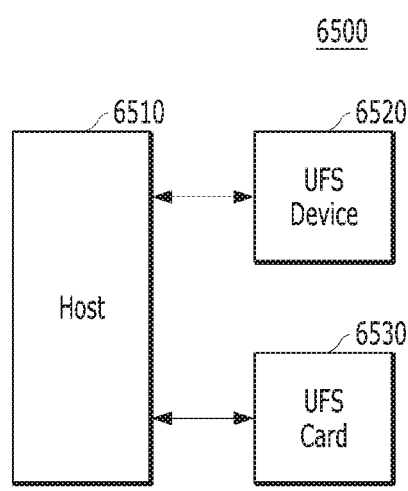

In the UFS system 6500 illustrated in FIG. 12, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In the embodiment of FIG. 12, the configuration in which one UFS device 6520 and one UFS card 6530 are connected to the host 6510 is illustrated by way of example. However, in another embodiment, a plurality of UFS devices and UFS cards may be connected in parallel or in the form of a star to the host 6510, and a plurality of UFS cards may be connected in parallel or in the form of a star to the UFS device 6520 or connected in series or in the form of a chain to the UFS device 6520.

Figure 13:
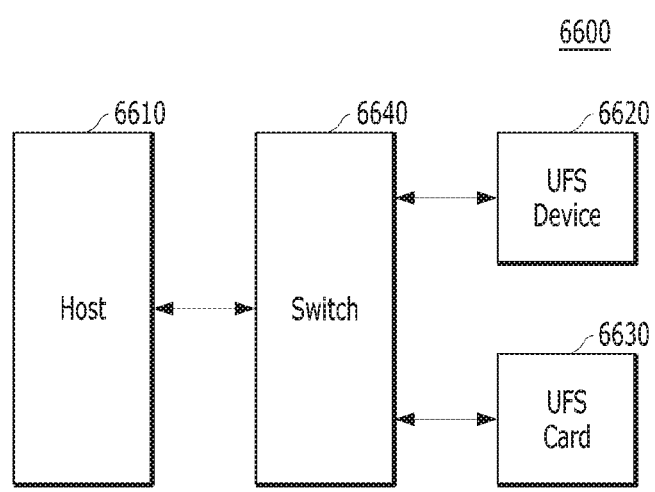

In the UFS system 6600 illustrated in FIG. 13, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the embodiment of FIG. 13, the configuration in which one UFS device 6620 and one UFS card 6630 are connected to the switching module 6640 is illustrated by way of example. However, in another embodiment, a plurality of UFS devices and UFS cards may be connected in parallel or in the form of a star to the switching module 6640, and a plurality of UFS cards may be connected in series or in the form of a chain to the UFS device 6620.

Figure 14:
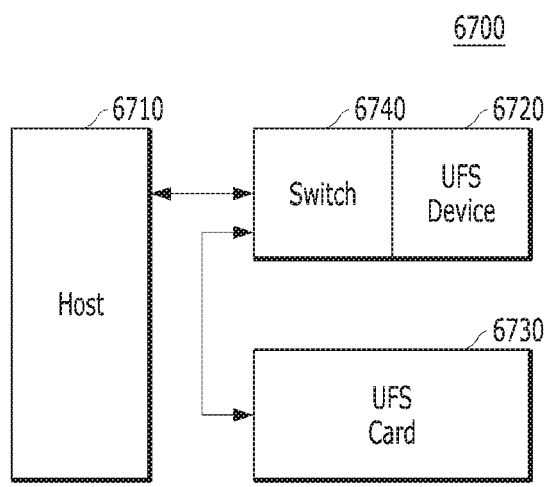

In the UFS system 6700 illustrated in FIG. 14, each of the host 6710, the UFS device 6720 and the UFS card 6730 may include UniPro. The host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the embodiment of FIG. 14, the configuration in which one UFS device 6720 and one UFS card 6730 are connected to the switching module 6740 is illustrated by way of example. However, in another embodiment, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 15:
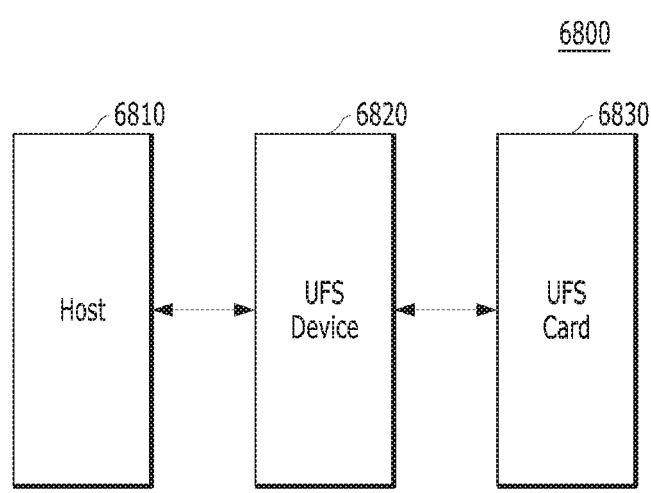

In the UFS system 6800 illustrated in FIG. 15, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target Identifier (ID) switching operation. The host 6810 and the UFS card 6830 may communicate with each other through target ID switching between the M-PHY and UniPro modules of the UFS device 6820. In the embodiment of FIG. 15, the configuration in which one UFS device 6820 is connected to the host 6810 and one UFS card 6830 is connected to the UFS device 6820 is illustrated by way of example. However, in another embodiment, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 16:
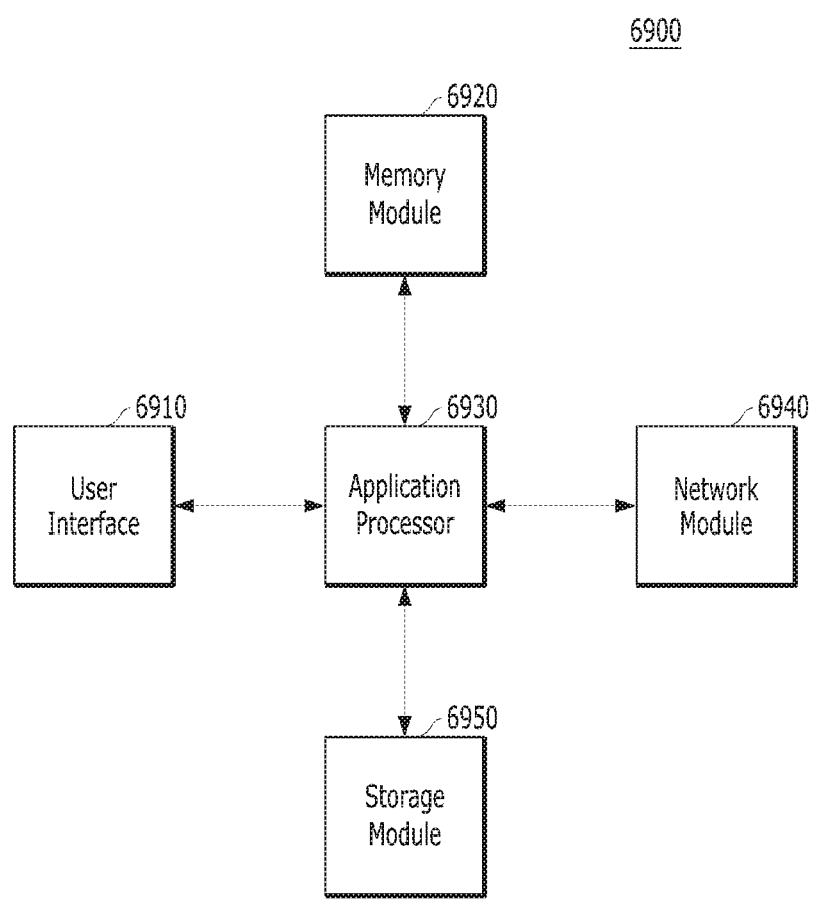

FIG. 16 is a diagram schematically illustrating another example of the data processing system including the memory system in accordance with an embodiment. FIG. 16 is a diagram schematically illustrating a user system 6900 to which the memory system may be applied.

Referring to FIG. 16, the user system 6900 may include a user interface 6910, a memory module 6920, an application processor 6930, a network module 6940, and a storage module 6950.

More specifically, the application processor 6930 may drive components included in the user system 6900, for example, an operating system (OS), and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile random access memory (RAM) such as a dynamic RAM (DRAM), a synchronous DRAM (SDRAM), a double data rate (DDR) SDRAM, DDR2 SDRAM, DDR3 SDRAM, LPDDR SDARM, LPDDR3 SDRAM or LPDDR3 SDRAM or a nonvolatile RAM such as a phase-change RAM (PRAM), a resistive RAM (ReRAM), a magneto-resistive RAM (MRAM) or a ferroelectric RAM (FRAM). For example, the application processor 6930 and the memory module 6920 may be packaged and mounted, based on Package on Package (PoP).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and/or 3D NAND flash, and provided as a removable storage medium such as a memory card or external drive of the user system 6900. The storage module 6950 may correspond to the memory system 110 described with reference to FIG. 1. Furthermore, the storage module 6950 may be embodied by any of an SSD, eMMC and UFS as described above with reference to FIGS. 10 to 15.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired and/or wireless communication with an external device. The user interface 6910 may display data processed by the processor 6930 on a display/touch module of the mobile electronic device, or support a function of receiving data from the touch panel.

Embodiments of the present invention provide a controller that is capable of reducing the extent of deterioration of a memory system occurring due to a garbage collection operation, and a method for operating the controller.

While the present invention has been illustrated and described with respect to the specific embodiments, it will be apparent to those skilled in the art in light of the present disclosure that various changes and modifications may be made without departing from the spirit and scope of the invention as defined in the following claims.

What is claimed is:

1. A controller for controlling a memory device including memory dies, the controller comprising:
   a processor suitable for checking whether or not any of the memory dies in the memory device is idle after transferring a write command to the memory device, and when there is an idle memory die, performing a garbage collection read operation of the idle memory die;
   a garbage collection (GC) data region suitable for storing valid data of a victim block, which is read through the garbage collection read operation; and
   a GC address region suitable for storing a valid data address corresponding to a region of a victim block of each of the memory dies that stores valid data,
   wherein the processor transfers the valid data to the memory device based on an amount of valid data stored in the GC data region and controlling the memory device to perform a garbage collection write operation of programming the valid data in a target block,
   wherein the processor controls a garbage collection read operation with reference to the GC address region,
   wherein the GC address region includes a GC address table which includes at least one entry for at least one valid address and an indicator for each of the memory dies, and
   wherein the indicator indicates whether an operation of read or write is completed.

2. The controller of claim 1, wherein the processor decides the victim block, among memory blocks, based on the amount of valid data stored in the memory blocks.

3. The controller of claim 1, wherein the processor checks whether there is a valid data address corresponding to the idle memory die in the GC address region.

4. The controller of claim 1, wherein the write command includes a garbage collection write command for controlling the garbage collection write operation.

5. The controller of claim 1, wherein the processor selects a free block, among free memory blocks, as the target block based on the extent of wear of the free block compared with the extent of wear of the other free memory blocks.

6. The controller of claim 1, wherein
when a garbage collection read operation for valid data corresponding to the valid data address is completed, the processor changes a valid data address of a corresponding entry of the GC address table into a first indicator, and
when a garbage collection write operation for the valid data is completed, the processor changes an indicator of the corresponding entry of the GC address table from the first indicator to a second indicator, and
when an updating of mapping information between a logical address to a physical address for the valid data is completed, the processor removes the second indicator.

7. The controller of claim 1, wherein when a victim block of each of the memory dies is decided, the processor stores a valid data address included in the victim block in an entry of each of the memory dies in an index order, and
the processor transfers the garbage collection read command to the memory device such that the garbage collection read operation is performed in the index order.

8. A method for operating a controller that controls a memory device including memory dies, the method comprising:
transferring a write command to the memory device;
checking whether any of the memory dies is idle after the transferring of the write command to the memory device;
when there is an idle memory die, storing valid data of a victim block, which is read through a garbage collection read operation of the idle memory die, in a garbage collection (GC) data region in the controller; and
transferring the valid data to the memory device based on an amount of valid data stored in the GC data region, and controlling the memory device to perform a garbage collection write operation of programming the valid data in a target block,
wherein the controller includes a GC address region which stores a valid data address corresponding to a region of a victim block of each of the memory dies that stores valid data,
wherein a processor controls a garbage collection read operation with reference to the GC address region,
wherein the GC address region includes a GC address table which includes at least one entry for at least one valid address and an indicator for each of the memory dies, and
wherein the indicator indicates whether an operation of read or write is completed.

9. The method of claim 8, further comprising:
deciding the victim block, among memory blocks, based on the amount of valid data stored in the memory blocks.

10. The method of claim 8, further comprising:
checking whether there is a valid data address corresponding to the idle memory die in the GC address region.

11. The method of claim 8, wherein the write command includes a garbage collection write command for controlling the garbage collection write operation.

12. The method of claim 8, further comprising:
selecting a free block, among the free memory blocks, as the target block based on the extent of wear of the free block compared with the extent of wear of the other free memory blocks.

13. A memory system comprising:
a memory device including memory dies; and
a controller suitable for controlling the memory device, the controller including a garbage collection (GC) data region suitable for storing items of valid data of a victim block, and a GC address region suitable for storing valid data addresses corresponding to the stored items of valid data of the victim block, wherein each of the valid data addresses is stored in association with the memory die where the corresponding item of valid data is stored;
wherein the controller is further suitable for:
storing the items of valid data of a victim block in the GC data region when the die on which the victim block resides in a specific state, and
controlling the memory device to perform a garbage collection write operation including transferring the items of valid data in the GC data region to a target block based on a condition pertaining to valid data stored in the GC data region,
wherein the GC address region stores a valid data address corresponding to a region of a victim block of each of the memory dies that stores valid data,
wherein a processor controls a garbage collection read operation with reference to the GC address region,
wherein the GC address region includes a GC address table which includes at least one entry for at least one valid address and an indicator for each of the memory dies, and
wherein the indicator indicates whether an operation of read or write is completed.

* * * * *